United States Patent [19]
Wilkins et al.

[11] Patent Number: 4,769,248
[45] Date of Patent: Sep. 6, 1988

[54] COATED, DRY-ROASTED NUTS AND PROCESS

[75] Inventors: Howard Wilkins, Brookfield; Peter M Gannis, Stamford, both of Conn.; Franklin V. Rumore, East Hanover, N.J.; Oris E. Holloway, Sparta, N.J.

[73] Assignee: Nabisco Brands, Inc., East Hanover, N.J.

[21] Appl. No.: 928,980

[22] Filed: Nov. 10, 1986

[51] Int. Cl.[4] .................................................. A23L 1/36
[52] U.S. Cl. .................................... 426/291; 426/293; 426/303
[58] Field of Search ............... 426/291, 292, 302, 303, 426/559, 629, 632, 661, 445, 460, 466, 93, 94, 102, 438, 293, 576

[56] References Cited

U.S. PATENT DOCUMENTS

| | | | |
|---|---|---|---|
| 3,314,800 | 4/1967 | Noznick | 426/93 |
| 4,053,650 | 10/1977 | Chino et al. | 426/93 |
| 4,161,545 | 7/1979 | Green et al. | 426/93 |
| 4,329,375 | 5/1982 | Holloway, Jr. et al. | 426/632 |
| 4,499,113 | 2/1985 | Mochezuki et al. | 426/93 |
| 4,501,758 | 2/1985 | Morris | 426/93 |
| 4,504,502 | 3/1985 | Earle et al. | 426/293 |
| 4,515,820 | 5/1985 | Tang | 426/93 |
| 4,522,833 | 6/1985 | Sharma | 426/93 |
| 4,556,572 | 12/1985 | Kaufman | 426/293 |
| 4,597,973 | 7/1986 | Moore | 426/309 |
| 4,647,463 | 3/1987 | Hoover | 426/632 |
| 4,663,175 | 5/1987 | Werner et al. | 426/93 |
| 4,692,342 | 9/1987 | Gannis | 426/93 |

*Primary Examiner*—Donald E. Czaja
*Assistant Examiner*—Carolyn Paden
*Attorney, Agent, or Firm*—Richard Kornutik

[57] ABSTRACT

This invention relates to a process for preparing dry roasted nuts, comprising applying a uniform coating of a starch to raw nuts, applying a uniform coating of a gelatin solution to the starch-coated nuts, applying a coating of a seasoning mix to the coated nuts, and roasting the resulting nuts. The invention further relates to the nuts produced thereby. The process of this invention produces nuts exhibiting increased uniformity of coating, improved flavor, enhanced coating adhesion and reduced clumping and sticking.

21 Claims, 1 Drawing Sheet

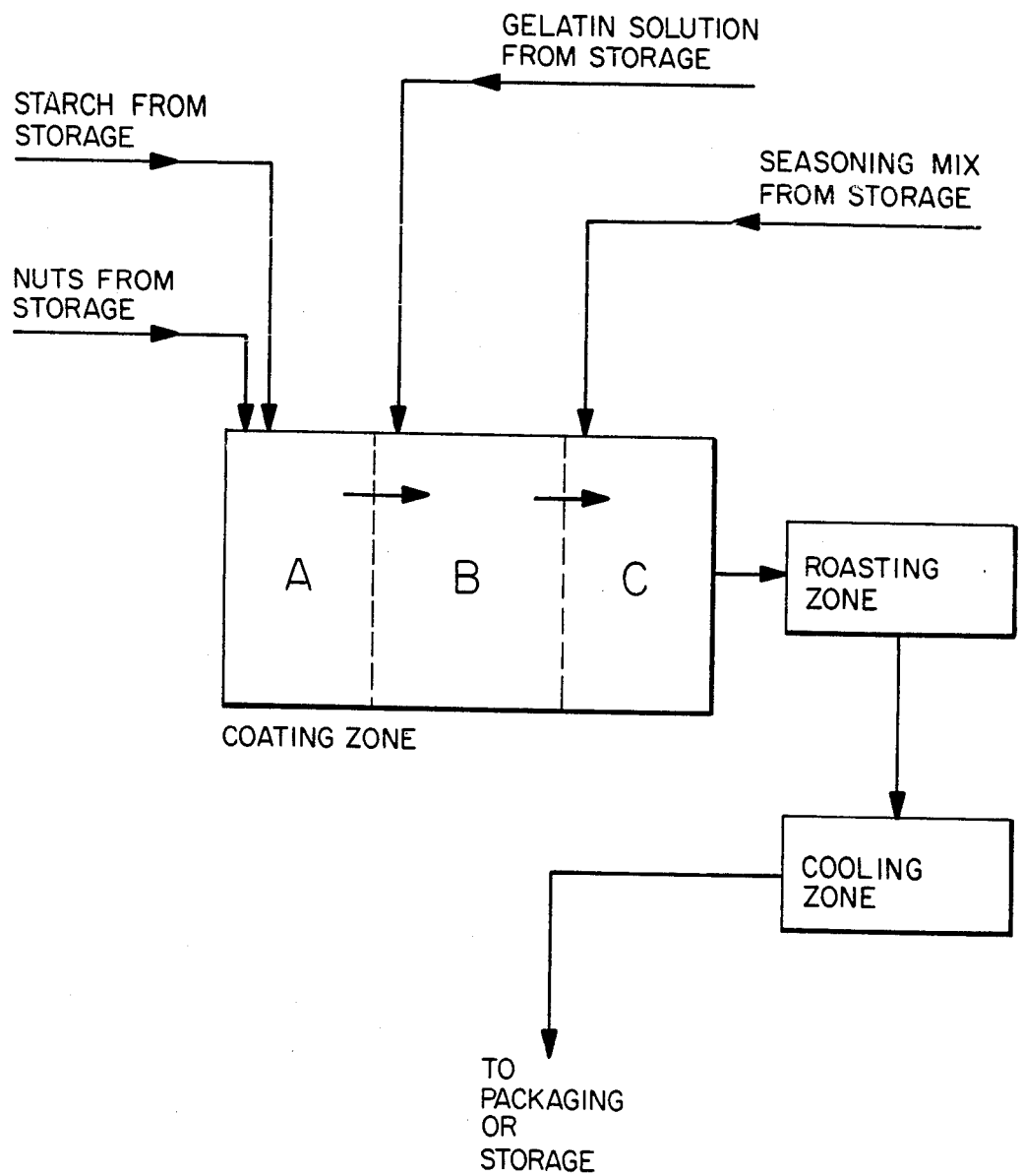

COATED, DRY-ROASTED NUTS AND PROCESS

BACKGROUND OF THE INVENTION

This invention relates to coated, dry-roasted nuts. More particularly, this invention relates to a process for preparing coated, dry-roasted nuts which exhibit superior coating adhesion and uniformity, and the nuts produced thereby.

U.S. Pat. No. 3,314,800 to Noznick et al. attempted to overcome the problem of poor salt adherence to nuts by first roasting nuts and then applying a coating of wheat gluten to the nuts while still hot. Noznick et al. further suggests the application of gluten and salt in a single wet phase. Although superior to the prior art, the method of this patent still has several drawbacks, including the undesirable requirement of coating nuts after roasting and while still hot and the limited number of seasonings which can be combined with gluten in a single wet phase.

U.S. Pat. No. 4,161,545 to Green et al. discloses a method for adhering a dry coating prior to roasting by first coating nuts with a honey solution and then the dry coating. Green et al. also recommends the use of an additional adhesive agent such as malto-dextrin, dextrins, edible polymers, gum arabic, guar and cellulose derivatives in combination with the honey solution.

U.S. Pat. No. 4,501,758 to Morris discloses the use of an aqueous mixture of sugar and one of gum arabic, gum acacia, guar, xanthan, corn syrup solids, dextrine or mixtures thereof as an adhesive for a sugar/starch/-dried honey mixture applied prior to roasting.

Unfortunately, the use of such prior art binders either requires coating after roasting or results in a substantial amount of coating loss which occurs during the coating, roasting, cooling, packaging and storage processes, or both. This coating loss often causes the product to take on an unattractive speckled appearance and is disadvantageous in terms of waste. Although the material shed from the nuts as a result of this coating loss can be reclaimed and re-used to coat a subsequent batch of nuts, reducing the amount of waste, such reclaim process is undesirable from the standpoint of both economy and product quality. Having a substantial amount of reclaim is expensive because extra handling is required to collect and re-use it. Product quality suffers from the re-use of reclaim due to that fact that product flavor is altered because some of the volatiles from the reclaim coating are lost during roasting. Furthermore, because reclaim contains nut oil, spoilage of the reclaim becomes a factor.

It has now been found, surprisingly, that use of a gelatin solution as a binder in conjunction with a starch substantially reduces the amount of coating loss and, hence, reclaim caused during the process of dry roasting nuts and does not require coating after the nuts are roasted.

U.S. Pat. No. 4,329,375 to Holloway, Jr. et al. discloses a process for preparing a low-fat nut wherein a reference is made to gelatin as a binder for seasonings. This patent, though, clearly does not suggest the use of gelatin solution as claimed herein, nor any appropriate amounts, nor the use of starch in concert with gelatin solution.

There remains a present need for a binder for dry-roasted, coated nuts whereby the amount of coating loss and reclaim caused by the roasting process is severely reduced.

SUMMARY OF THE INVENTION

This invention relates to a process for producing dry-roasted nuts and the nuts produced thereby. More particularly, this invention relates to a process wherein raw nuts are first coated with a starch and then coated with a gelatin solution. The gelatin-coated nuts are then coated with a seasoning mix and thereafter roasted.

The use of gelatin solution, especially in combination with a starch, has been found to increase the adhesion of subsequent coatings to the nuts, thereby substantially reducing the amount of reclaim caused.

DESCRIPTION OF THE DRAWING

This invention will be better understood and its advantages will become more apparent from the following detailed description, especially when read in light of the attached drawing, which is a flowsheet illustrating schematically one embodiment of the process of the invention.

DETAILED DESCRIPTION OF THE INVENTION

The nuts which are treated in accordance with this invention can be any edible nuts which are conventionally packaged and sold as snack-type products or which are utilized for decoration or as fillers in the confectionery and baked foods industries. Illustrative of such nuts are peanuts, cashews, almonds, walnuts, filberts, macadamia nuts, pecans, and the like. Particularly preferred are peanuts and cashews.

The nuts are deshelled in a preliminary step and, optionally, may also be subjected to other conventional procedures such as blanching prior to being subjected to the process of the invention. The term "raw nuts" is used hereinafter to refer to nuts in the form in which they are subjected to the first step of the process of the invention irrespective of any preliminary treatment which has been applied to the nuts. Thus, white-roasted nuts and nuts which have been subjected to a process to remove a portion of their fat content are included within the meaning of this term.

In an initial step of the process of the invention, a coating of a starch is applied to the raw nuts. The starch may be any starch which exhibits the characteristic of absorbing moisture or water from a subsequent coating (i.e., a gelatin solution), as will be explained in more detail below. It is an advantage of the invention that unmodified starches e.g. starches which have not been chemically modified to improve their solubility or dispersibility can be employed with highly acceptable results. Preferably, the starch employed is corn starch, wheat starch, potato starch, tapioca starch, or mixtures thereof. Most preferably, the starch is corn starch.

This starch coating may be accomplished using any conventional coating means employed in the art and under conditions effective to uniformly coat the nuts with starch. Advantageously, the coating is accomplished in a conventional coating drum. The nuts are introduced into the drum and an appropriate amount of starch is introduced while providing agitation by rotating the drum until the nuts are uniformly coated with a layer of the starch. Preferably, particularly when this process is being performed on a continuous basis as described more fully below, the nuts and starch are introduced into the drum simultaneously in the appropriate proportions, and rotation of the drum is carried out as before until uniform coating is achieved. In general, the starch is applied to the nuts at a rate of about 0.10 to about 0.35 parts by weight of starch per 100 parts by weight of nuts.

After the nuts have been uniformly coated with the starch in the manner described above, they are subjected to a coating operation in which a coating of a gelatin solution is applied. This coating can be applied using conventional coating means such as the coating drum described above in relation to the starch coating step. If desired, the application of the gelatin solution coating can be carried out immediately after the starch coating operation is completed and while the nuts are still present in the coating apparatus employed for the starch coating operation.

Importantly, the ratio of gelatin solution applied to starch applied to the nuts must be suitable to achieve the proper surface conditions for adhesion of any subsequent dry coating. The ratio of gelatin solution applied to starch applied can generally be in the ratio of about 10:1 to about 18:1 to accomplish this.

Advantageously, the gelatin solution is prepared as a solution of about 5% to about 9% gelatin, typically in water. More preferably, the gelatin solution is a solution of about 6% to about 8% and, most preferably, about 7% gelatin. Preparation of the gelatin solution may be by conventional means known in the art. For instance, gelatin, such as an edible beefskin gelatin, is combined with water which has been heated to a temperature of about 160° F. to about 180° F., preferably about 170° F., and mixed until complete solution is achieved.

One of the distinguishing features of the process of the invention lies in the use of the gelatin solution. It has been found that the gelatin solution in concert with starch provides substantially greater adhesion of any subsequently-applied dry coatings and leads to a dry-roasted nut exhibiting superior uniformity of coating. Although the exact mechanism is unclear, it is believed that the starch absorbs much of the water from the gelatin solution, thereby providing the nuts with a surface to which a subsequent dry coating will readily adhere. Such a tacky surface provides the increased adhesion exhibited by the nuts of this invention.

Preferably, the gelatin solution is applied to the nuts at a rate of about 2.0 to about 4.5 parts by weight of gelatin solution per 100 parts by weight of nuts.

After the nuts have been uniformly coated with gelatin solution as described above, they are subjected to a further coating operation in which a dry coating of a seasoning mix is applied. This coating can be applied using conventional means such as described above and can be carried out immediately after the gelatin solution coating operation is completed and while the nuts are still present in the coating drum employed for the gelatin solution coating operation.

In a particular embodiment, which is employed advantageously when the process of the invention is being operated on a continuous basis, the three coating operations are carried out sequentially in a single coating drum which is inclined and/or provided with means such as a helical auger for advancing the nuts along the length of the drum as the drum is rotated. The starch is applied to the nuts in a first section of such a device and, after the nuts have been uniformly coated, the gelatin solution is introduced in a second section of the device, and, thereafter the seasoning mix introduced in a third section. The residence time of the nuts in such a coating device is adjusted, advantageously by adjusting the speed of rotation of the drum or its angle to the horizontal, so as to provide adequate time for each coating to be accomplished uniformly and completely.

The seasoning mix to be coated on the nuts may be of any composition suitable for providing the nuts with the flavor desired. Preferably, the seasoning mix comprises salt, starch and sugar. Although the precise mechanism is not fully understood, it is felt that the use of sugar in the seasoning mix also contributes to the increased adhesion of the seasoning mix to the gelatin and starch coated nuts. Sugar is, therefore, a highly desired component of the seasoning mix. The starch used in the seasoning mix is preferably corn starch. Monosodium glutamate is also often included in the seasoning mix as a flavor enhancer. Preferably, the seasoning mix is also comprised of an additional flavor enhancer comprising a spice mix to provide the desired flavor to the nuts. A suitable spice mix may include gelatin, yeast, dried corn syrup, allspice, cinnamon, clove, carroway, bay, sage, ginger, basil, paprika and other spices, natural flavor, garlic powder and onion powder, in any suitable combination. Additionally, although the amount of reclaim generated by this process is greatly reduced, some coating loss is unavoidable. The reclaim which is generated may be combined with the fines, screened and ground and added to the seasoning mix. The seasoning mix is prepared by combining in admixture the desired ingredients.

Preferably, the seasoning mix is applied to the nuts at a rate of about 3 to about 7 parts by weight of seasoning mix per 100 parts by weight of nuts.

After the application of the seasoning mix the coated nuts are subjected to air (i.e., dry) roasting under conditions which may vary depending upon the particular type of raw nut. Illustratively, the nuts are roasted at temperatures within the range of about 240° F. to about 350° F. for a time which will vary depending upon the particular roasting temperature employed, the particular type of nut being processed, and the degree of roasting desired. For example, the time and extent of roasting will be greater in the case of peanuts than in the case of cashews. The most appropriate roasting conditions to be adopted in any particular instance are apparent to the skilled artisan or can be determined readily by a process of trial and error.

The roasting operation can be conducted on a batch or continuous basis. In the case of a continuous air roasting operation, the nuts are placed on a continuous foraminous belt and transported through a roasting oven heated to a temperature in the above range. The residence time of the nuts in the oven is adjusted to provide the desired time of roasting. Any of the apparatus conventionally employed in the art to effect dry roasting of nuts can be utilized in the above batch or continuous roasting step. It is an advantage of the present invention that superior results are achieved when air roasting nuts coated in the manner described above.

The dry-roasted nuts which result from the above combination of steps may thereafter be agitated to singularize them and then cooled, or allowed to cool, and packaged in any appropriate manner for marketing. Advantageously, the cooling of the nuts is accomplished in a relatively short period of time, about 5 minutes or less, to avoid continuation of the roasting process after the nuts have emerged from the roasting oven.

The nuts prepared in accordance with the process of the invention are characterized by: improved overall appearance, especially coating uniformity; improved flavor especially because less reclaim is present in the seasoning mix; and improved physical characteristics, including reduced clumping or sticking, and enhanced coating adhesion.

The flowsheet shown in the FIGURE illustrates a continuous process for dry-roasting nuts in an air roaster in accordance with the invention. In the first step of this process the raw nuts and the starch, as described above, are conveyed by appropriate means from storage facilities (not shown) and are introduced continuously and in the desired proportions, as discussed above, to the coating zone via an entry port in the first section (A). The coating zone comprises any mechanical continuous coating means commonly employed in the coating art. Illustrative of such apparatus are revolving coating drums in which the nuts are caused to tumble to provide even distribution of the starch over the surface of the raw nuts. Advantageously, the coating apparatus takes the form of a cylindrical coating drum mounted with its longitudinal axis aligned at a slight angle to the horizontal with the entry port at the elevated end and adapted to rotate at a rate effective to impart a tumbling action to the nuts and to cause the nuts to be propelled towards the exit port of the device.

Alternatively, the coating apparatus employed in the coating zone may comprise an open trough having a semicircular cross-section which is provided with agitating and propulsion means such as a rotating helical auger for imparting the tumbling action necessary to ensure uniform coating to the nuts and, at the same time, for causing the nuts to be conveyed at a rate along the length of the coating zone which ensures pickup of the proper amount of coating in the proper consistency.

Advantageously, the nuts enter the process raw at ambient temperature and are admixed with the starch. The combined mix of the nuts and the starch is tumbled as it is advanced through the zone, typically for less than one minute, e.g., about 15 seconds, prior to application of the gelatin solution, to achieve a uniformly complete coating of the starch on the individual nuts. Prior to introduction into the coating zone, the gelatin solution is preheated to a temperature effective to enable coating sufficient to achieve proper surface tackiness to facilitate adhesion of subsequent dry coatings. The exact temperature will be dependent upon the particular equipment used and other processing parameters, as would be radily determinable to the skilled artisan.

The gelatin solution and the nuts are blended, by continuing to tumble and advance the nuts, to achieve a uniform coating of the solution on the nuts. This coating step can be accomplished preferably in a later section (B) of the same coating apparatus as that employed in the continuous application of the starch. Alternatively, the continuous application of the gelatin solution can be performed in a separate coating apparatus to which the stream of coated nuts is conveyed by means such as a continuous conveyor belt or the like. When such a separate coating apparatus is employed, it can take the form of any of the apparatus described and exemplified in reference to the other coating procedures. Tumbling is continued until the combined starch and gelatin solution coatings provide a surface tackiness effective to pick up and hold the seasoning mix coating. This will typically be achieved in less than one minute of tumbling, e.g., about 30 seconds.

The stream of coated nuts encounters a continuous stream of seasoning mix coating of the composition described above which is introduced into the coating zone at a rate which is adjusted to provide the desired proportion of seasoning mix to nuts in the ranges discussed above. This coating step can be accomplished preferably in a later section (C) of the same coating apparatus as that employed in the continuous application of the gelatin solution. Alternatively, the continuous application of the seasoning mix can be performed in a separate coating apparatus to which the stream of coated nuts is conveyed by means such as a continuous conveyor belt or the like. When such a separate coating apparatus is employed it can take the form of any of the apparatus described and exemplified in reference to the other coating procedures.

The rate of continuous passage of the nuts through the second and third coating sections (B) and (C), whether these sections form part of the same coating apparatus as section (A) or are separate coating apparatus, is adjusted so as to permit the uniform application of a coating of the gelatin solution and seasoning mix, respectively, to the nuts prior to removal of the coated nuts from the coating zone. Advantageously, the rate of passage of the nuts is adjusted so that the total residence time of the nuts in sections (A), (B) and (C) will be less than about 5 minutes, and preferably from about 0.5 to about 2 minutes.

The coated nuts emerging on a continuous basis from the coating zone are then conveyed, by continuous belt conveyor or like means, to the roasting zone wherein the coated nuts are subjected to air roasting for a predetermined period of time and at a temperature in the range of about 240° F. to about 350° F. As discussed above, the precise range of temperature employed in any given instance depends upon the particular nut being treated. The apparatus employed in the roasting zone can be any of the air (dry) roasting devices known in the art which are capable of operation on a continuous basis. Such devices generally comprise an endless foraminous belt which carries a bed of nuts through a succession of heating zones, usually followed by a cooling zone. Prior to or during cooling, the nuts are agitated to ensure separation for the best results.

In general, the residence time of the coated nuts in the roasting zone varies within the range of about 15 to about 30 minutes depending upon the particular type of nut being treated, the roasting temperatures and the bed depth. Illustratively, the longer residence times within the above range are appropriate when peanuts are being subjected to temperatures as noted above at bed depths of from about 2 to about 10 inches, whereas shorter residence times are appropriate for cashew nuts under similar conditions.

In an optional, but desirable, final stage of the process, the continuous flow of roasted nuts emerging from the roasting zone is then discharged onto a continuous belt conveyor or like conveying means and transferred to the cooling zone in which the temperature of the nuts is reduced rapidly, illustratively within a period of about 5 minutes and preferably less than about 2 minutes, to a temperature below about 100° F. This operation serves to ensure that excessive roasting of the nuts, because of maintenance of the higher temperatures at which the nuts emerge from the previous step, does not occur. It is also found that the tendency of the roasted nuts to adhere to each other, especially upon storage, is greatly reduced, if not eliminated, by agitation and passage through the cooling zone. This latter zone advantageously comprises a closed or partially closed area through which air or inert gas, at temperatures of about 100° F. or less, is caused to flow at a rate sufficient to achieve the desired reduction in temperature of the nuts. The efficiency of this cooling step is greatly enhanced by transporting the nuts through the cooling zone on a conveyor belt which is perforated to permit passage therethrough of cooling air or inert gas. A particularly preferred embodiment employs a continuous wire mesh belt conveyor permitting maximum contact between cooling gas and the nuts.

In a feature of the continuous process of the invention, the nuts are agitated by a horizontal mechanical mixer as they are being transferred from the roasting zone to the cooling zone or within the cooling zone. This operation is designed to effect separation or singularization of the individual nuts. This can be achieved in any convenient manner, such as by employing an oscillating belt conveyor or by operating the belt conveyor, onto which the flow of nuts is discharged from the roasting zone, at a faster speed than the stream of nuts is moving as it exits that zone. The sudden acceleration in rate of movement of the nuts serves to achieve the desired separation.

The stream of dry-roasted nuts emerging from the cooling zone is then collected and transported by any appropriate means to a packaging station (not shown) where packaging of the nuts by any appropriate and conventional means is accomplished or into an appropriate storage facility.

The following non-limiting Example illustrates a process for the continuous production of coated, dry roasted peanuts in accordance with the embodiment shown in FIG. 1 and discussed above. Unless otherwise indicated, all parts and percentages are by weight.

EXAMPLE

A gelatin solution is prepared from the following ingredients and proportions (all parts by weight):

|  | Parts |
| --- | --- |
| Gelatin | 7 |
| Water | 93 |

The gelatin is mixed into heated water to obtain a gelatin solution which is transferred to a heated holding tank.

A continuous stream of blanched peanuts (Jumbo Runners) is introduced at a rate of 150 lbs per minute into the entry port of a cylindrical coating drum rotating at a speed of about 12 rpm. At the upper end of the drum, just after introduction of the nuts, corn starch is introduced onto the tumbling nuts at a rate of about 0.35 pounds per minute to coat the nuts with a uniform coating of the corn starch. At a location in the coating drum corresponding to an initial 5 seconds residence time for the nuts, there is introduced a continuous steam of the gelatin solution (prepared as described above) at a rate of about 2.2 liters per minute. At a location in the coating drum corresponding to 30 seconds residence time following the introduction of the gelatin solution, there is introduced, at a rate of about 8.1 lbs/minute, a seasoning mix prepared by intimate blending of the following ingredients in the indicated ratios: salt (flour), about 4: corn starch, about 2: flavor enhancers, about 1.5: sugar, about 1.5: fines and reclaimed coating (screened and ground), about 1.

A stream of coated nuts is discharged from the exit port of the coating drum onto an oscillating conveyor after a total average residence time in the coating drum of about 1 minute. The oscillating conveyor builds a four-inch deep bed of the coated nuts on a perforated endless conveyor which advances to a Procter and Shwartz four-zone gas-fired roaster. The roasting temperature is maintained at 265° F. in the first two heating zones and 335° F. in the two final heating zones. The average residence time in the roaster is about 30 minutes. Following the last of the heating zones, the nuts are agitated by an in-line horizontal mechanical mixer, enabling the nuts to be easily separated following cooling. While the nuts are undergoing agitation, they are subjected to cooling by a stream of air at ambient temperature (ca 70° F.). The average residence time of the nuts in this zone is about 2 minutes and the temperature of the nuts emerging from the zone is about $100° \pm 10°$ F. As the nuts emerge from the cooling zone, they are free-flowing and separate.

The resulting dry-roasted nuts are then transferred to a packaging station and sealed in predetermined quantities in containers for distribution to wholesale and retail outlets.

It is to be understood that the above Example is given by way of illustration only and is not to be construed as limiting the invention.

What is claimed is:

1. A process for preparing dry-roasted nuts which comprises:
   (a) applying starch to the surface of raw nuts under conditions effective to obtain a uniform coating of starch on the raw nuts in a first coating step;
   (b) applying a gelatin solution to the starch-coated nuts in a second coating step under conditions effective to uniformly coat the nuts with gelatin solution and produce a surface to which a subsequently applied seasoning mix will adhere;
   (c) applying a seasoning mix comprising sugar to the gelatin-coated nuts under conditions effective to obtain a coating of seasoning mix on the nuts in a third coating step; and
   (d) heating the resulting thus coated nuts under conditions effective to impart a roasted nut color, flavor and aroma and dry and firmly adhere the coatings to the nuts.

2. The process of claim 1 wherein the ratio of gelatin solution applied in said second coating step to starch applied in said first coating step is about 10:1 to about 18:1.

3. The process of claim 2 wherein said starch is applied at a rate of about 0.10 to about 0.35 parts by weight of starch per 100 parts by weight of nuts and said gelatin solution is applied at a rate of about 2.0 to about 4.5 parts by weight of solution per 100 parts by weight of nuts.

4. The process of claim 1 wherein said starch is selected from the group consisting of corn starch, wheat starch, potato starch, hydrolyzed starch, tapioca starch, modified food starch and mixtures thereof.

5. The process of claim 4 wherein said starch is corn starch.

6. The process of claim 2 wherein said gelatin solution is a solution comprising from about 5% to about 9% gelatin.

7. The process of claim 6 wherein said gelatin solution is a solution comprising about 7% gelatin.

8. The process of claim 1 wherein said seasoning mix is applied at a rate of about 3 to about 7 parts by weight of seasoning mix per 100 parts by weight of nuts.

9. The process of claim 1 wherein said seasoning mix further comprises salt and starch.

10. The process of claim 9 wherein said seasoning mix further comprises ingredients selected from the group consisting of monosodium glutamate, yeast, gelatin, dried corn syrup, allspice, cinnamon, clove, carroway, bay, sage, ginger, basil, paprika, garlic powder, onion powder and mixtures thereof.

11. The process of claim 1 wherein said nuts are heated in a hot air roaster at a temperature of about 240° F. to about 350° F.

12. A process for preparing dry-roasted nuts comprising:
  (a) applying corn starch to the surface of raw nuts under conditions effective to obtain a uniform coating of starch on the raw nuts in a first coating step;
  (b) applying a gelatin solution to the starch-coated nuts in a second coating step, wherein said gelatin solution comprises about 7% gelatin, under conditions effective to uniformly coat the nuts with gelatin solution and produce a surface to which a subsequently applied seasoning mix will adhere;
  (c) applying a seasoning mix to the gelatin-coated nuts in a third coating step under conditions effective to coat the nuts with seasoning mix, wherein said seasoning mix comprises salt, starch and sugar and is applied at a rate of about 3 to about 7 parts by weight of seasoning mix per 100 parts by weight of nuts; and
  (d) roasting the resulting thus coated nuts under conditions effective to impart a roasted nut color, flavor and aroma and dry and firmly adhere the coating to the nuts.

13. The process of claim 12 wherein said seasoning mix further comprises ingredients selected from the group consisting of monosodium glutamate, yeast, gelatin, dried corn syrup, allspice, cinnamon, clove, carroway, bay, sage, ginger, basil, paprika, garlic powder, onion powder and mixtures thereof.

14. A process for preparing dry-roasted nuts which comprises the steps of:
  (a) continuously feeding raw nuts through a coating zone;
  (b) applying a uniform coating of starch to the nuts during passage through a first section of said coating zone;
  (c) applying a uniform coating of a gelatin solution to the nuts during passage through a second section of said coating zone;
  (d) applying a coating of a seasoning mix during passage through a third section of said coating zone; and
  (e) continuously conveying the coated nuts through a heating zone in which the coated nuts are roasted at a temperature of from about 240° F. to about 350° F.

15. The process of claim 14 which further comprises continuously conveying the roasted nuts through a cooling zone.

16. The process of claim 14 wherein said starch comprises corn starch.

17. The process of claim 16 wherein the ratio of gelatin solution applied to corn starch applied is about 10:1 to about 18:1.

18. The process of claim 17 wherein said gelatin solution comprises about 6% to about 8% gelatin.

19. The process of claim 18 wherein said seasoning mix comprises salt, starch and sugar.

20. The process of claim 19 wherein said seasoning mix further comprises ingredients selected from the group consisting of monosodium glutamate, yeast, gelatin, dried corn syrup, allspice, cinnamon, clove, carroway, bay, sage, ginger, basil, paprika, garlic powder, onion powder and mixtures thereof.

21. The process of claim 20 wherein said seasoning mix is applied at a rate of about 3 to about 7 parts by weight of seasoning mix per 100 parts by weight of nuts.

* * * * *